United States Patent
Szigeti

(10) Patent No.: US 6,685,070 B2
(45) Date of Patent: Feb. 3, 2004

(54) MODULAR CARGO CARRIER SYSTEM FOR VEHICLE ROOF

(76) Inventor: Josef Szigeti, 3 Cove, Irvine, CA (US) 92604

( * ) Notice: Subject to any disclaimer, the term of this patent is extended or adjusted under 35 U.S.C. 154(b) by 0 days.

(21) Appl. No.: 10/146,968

(22) Filed: May 16, 2002

(65) Prior Publication Data

US 2003/0213824 A1 Nov. 20, 2003

(51) Int. Cl.⁷ .................................................. B60R 9/00
(52) U.S. Cl. .................... 224/321; 224/324; 224/325; 224/571; 224/572; 224/917.5; 224/924; 211/23; 211/70.5; 248/207; 248/237; 248/223.21; 248/911; 248/912
(58) Field of Search .............................. 224/319, 321, 224/324–326, 546, 309, 917.5, 537, 484–486, 571, 572, 924; 211/23, 24, 70.5; 248/687, 558, 207, 237, 219.1, 219.4, 222.14, 223.31, 223.41, 223.21, 346.06, 346.4, 911, 912; 414/462, 464

(56) References Cited

U.S. PATENT DOCUMENTS

| 2,988,253 | A | * | 6/1961 | Menghi ...................... 224/324 |
| 4,326,655 | A | * | 4/1982 | Gradek et al. ............... 224/324 |
| 5,052,605 | A | * | 10/1991 | Johansson .................... 224/324 |
| 5,383,589 | A | * | 1/1995 | Tracy et al. ................. 224/324 |
| 5,702,007 | A | * | 12/1997 | Fritz et al. ..................... 211/17 |
| 5,738,258 | A | * | 4/1998 | Farrow et al. ............... 224/324 |
| 6,164,507 | A | * | 12/2000 | Dean et al. .................. 224/324 |
| 6,446,850 | B2 | * | 9/2002 | Ming-Shun ................. 224/324 |
| 6,467,664 | B2 | * | 10/2002 | Robins et al. ............... 224/537 |
| 6,564,949 | B1 | * | 5/2003 | Saathoff .................... 211/70.6 |

* cited by examiner

*Primary Examiner*—Nathan J. Newhouse
(74) *Attorney, Agent, or Firm*—Roth & Goldman, P.A.

(57) ABSTRACT

A modular cargo carrier system comprising at least one pair of carrier modules and means for attaching said modules to a vehicle or to a support on a vehicle. The modules each have a top, a bottom, sides and ends, the attaching means being located on at least a bottom and one side whereby the modules may be mounted in different orientations on the vehicle top to carry different types of cargo. The modules further include longitudinal and transverse cargo grooves or contoured cargo contact surfaces on the top and on at least one side and/or end for supporting cargo in said grooves. Module connectors are provided for attaching the modules to each other in a variety of configurations.

33 Claims, 12 Drawing Sheets

MODULAR CARGO CARRIER SYSTEM FOR VEHICLE ROOF

BACKGROUND OF THE INVENTION AND PRIOR ART

1. Field of the Invention

The present invention relates in general to vehicle roof cargo carriers and, more particularly, to a modular carrier which can be configured as desired for transporting various articles such as bicycles, skis, snow boards, surf boards, boats and packaged articles atop or behind various types of vehicles including automobiles, SUV's, vans and pick-up trucks.

2. Prior Art

The prior art is replete with various vehicle roof racks for loading boats, wheel chairs, ladders, luggage and other cargo atop a vehicle but none are easily configured to widely varying cargo of different configurations.

OBJECT OF THE INVENTION

It is accordingly an object of the present invention to provide a modular cargo carrier which may easily be assembled in various configurations to carry cargo of different types on vehicles.

SUMMARY OF THE INVENTION

The present invention accordingly provides a cargo carrier module having a top, a bottom, sides and ends. Means are provided on the bottom and on at least one of the sides and/or ends for attaching the module to a support. The module further includes grooves on the top and on at least one of said sides and/or ends, at least some of the grooves having different cross-sectional configurations for supporting cargo of different configurations in said grooves.

DESCRIPTION OF THE PREFERRED EMBODIMENT

Figure 1:
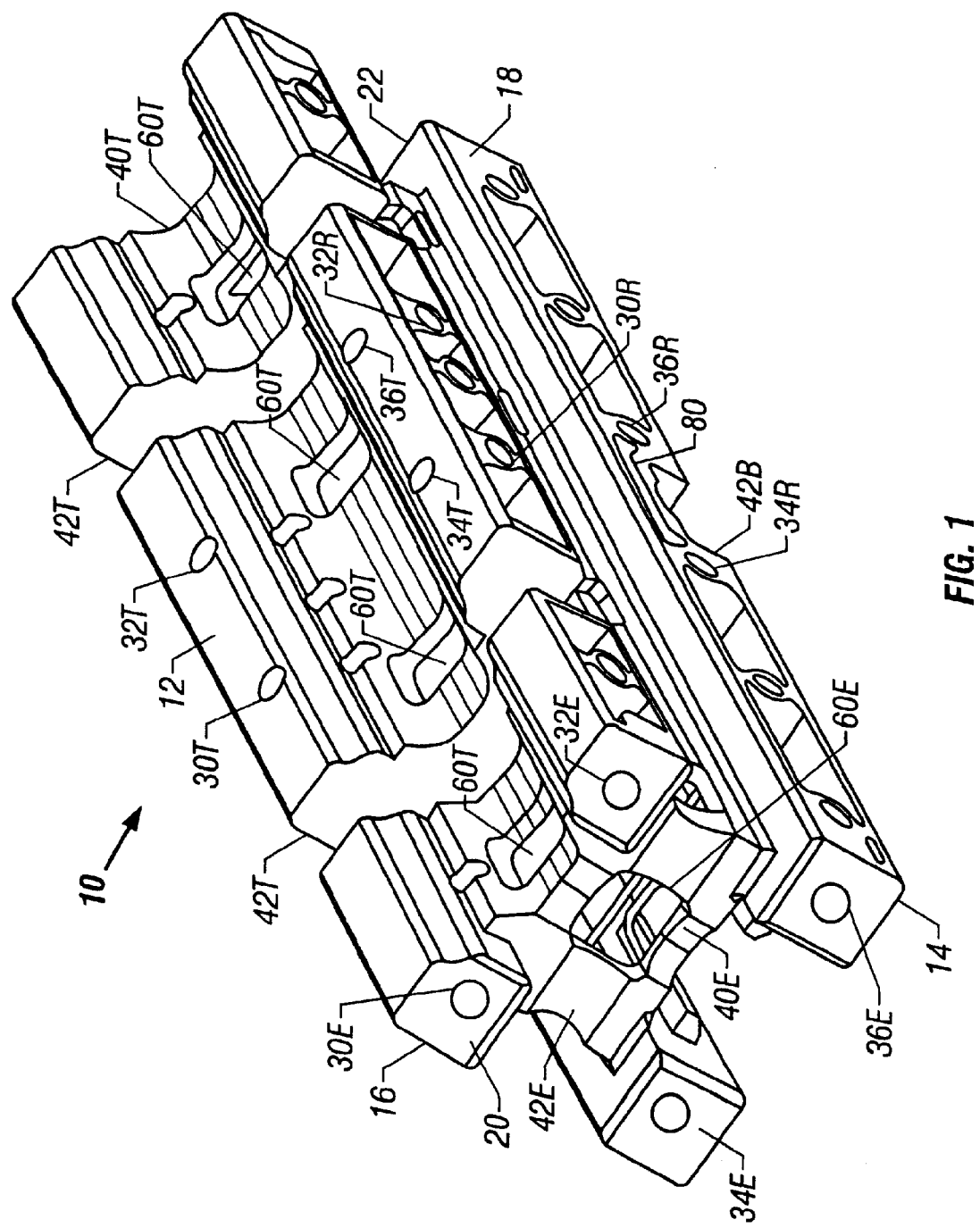
FIG. 1 is a perspective view of a first embodiment of one carrier module.

The modular cargo carrier system of the present invention is comprised of at least one pair of carrier modules 10 as seen in FIG. 1 which may be oriented and arranged in various positions atop a vehicle to carry cargo of different types as seen in FIGS. 6–11.

In this embodiment, the carrier module 10 preferably takes the form of a generally rectangular, preferably elongated and square, block of molded plastic or other strong lightweight material such as aluminum or composite and has various surfaces which will be referred to as a top 12, bottom 14, left and right sides 16, 18 and ends 20, 22. The modules 10 may be attached directly to a vehicle top or at the rear of the vehicle, and/or to supports of various types such as bars which extend longitudinally or transversely across a vehicle top or which are provided at the rear of the vehicle. The modules 10 include preferably circular attachment apertures such as a plurality of internally threaded, blind bores 30, 32, 34, 36. Non-threaded or threaded through bores can be used instead if desired. Referring to the module seen in FIG. 1, the internally threaded attachment bores are seen on the top, at least one end, and on the right side and are respectively designated with identifiers T for top, E for end, and R for right. The bores 30, 32, 34, 36 are also preferably arranged at the corners of squares, although, again, this is not essential. In its broadest aspects, the modules 10 are provided with means for attachment of the modules to a vehicle on at least one surface which will be called the bottom 14 of the module and on at least one of the sides 16, 18 and/or ends 20, 22. Bores may also be provided on each side 16, 18 and each end 20, 22 of the module. Although the bottom 14 of the module is not seen in FIG. 1, due to the generally symmetrical configuration of the module 10, the bores 30T, 32T, 34T, and 36T on the top 12 of the module may function as attachment means on the bottom of the module if the module is turned upside down from the position seen in FIG. 1. Preferably, aligned bores 30, 32, 34 and 36 are provided on oppositely facing surfaces of the module 10 such as both the top 12 and the bottom 14 surfaces. Similarly, bores 30E, 32E, 34E and 36E may be provided on each end 20, 22 in general alignment with each other as will bores 30, 32, 34 and 36 on each side of the module 10. Although the bores 30, 32, 34 and 36 need not be provided on all surfaces of the module 10, the provision of outwardly open attachment bores 30, 32 34, 36 in all of the locations described provides great advantages since this enables the modules 10 to be attached to mounting rails or other mounts on the vehicle from the bottom, top, either side and either end of the modules as desired. Also, individual modules 10 may be easily attached to each other to form a desired configuration as will be described.

Figure 4:
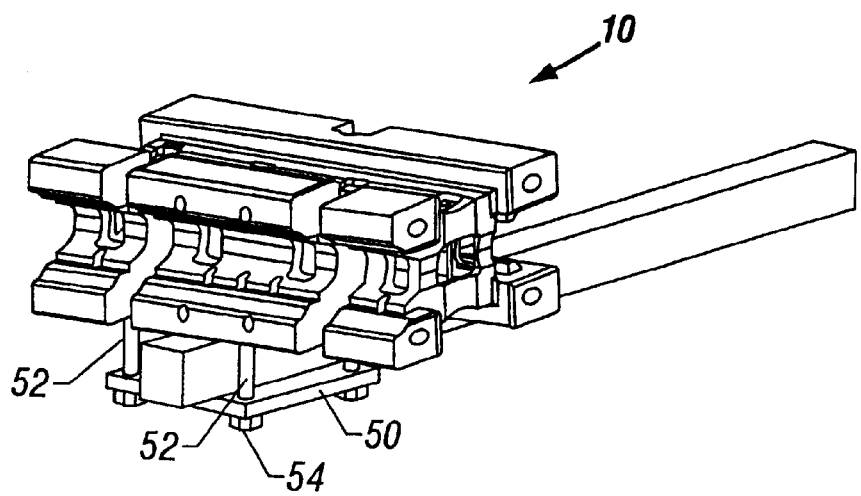
FIG. 4 is a perspective view of one manner of mounting carrier modules on rooftop bars of a vehicle such as an automobile.

FIG. 4 shows a clamp 50 suitable for attaching the modules 10 to existing vehicle roof rack bars. The clamp 50 is depicted schematically as a rectangular plate although other clamp configurations can be used as desired. A plurality of threaded fasteners 52 are provided for affixing the clamps 50 to the modules 10, the threaded fasteners being received in the attachment bores 30, 32, 34, 36. At least one of the fasteners 52 preferably has a head 54 of irregular cross-sectional configuration which may be grasped only by a wrench of complementary configuration so that unauthorized persons not having access to the wrench are unable to easily remove the fasteners 52 to disconnect the module 10 from the vehicle. The clamps 50 are preferably provided with holes, slots, or other apertures which loosely receive the threaded fasteners 52 thus permitting minor adjustment.

Figure 2:
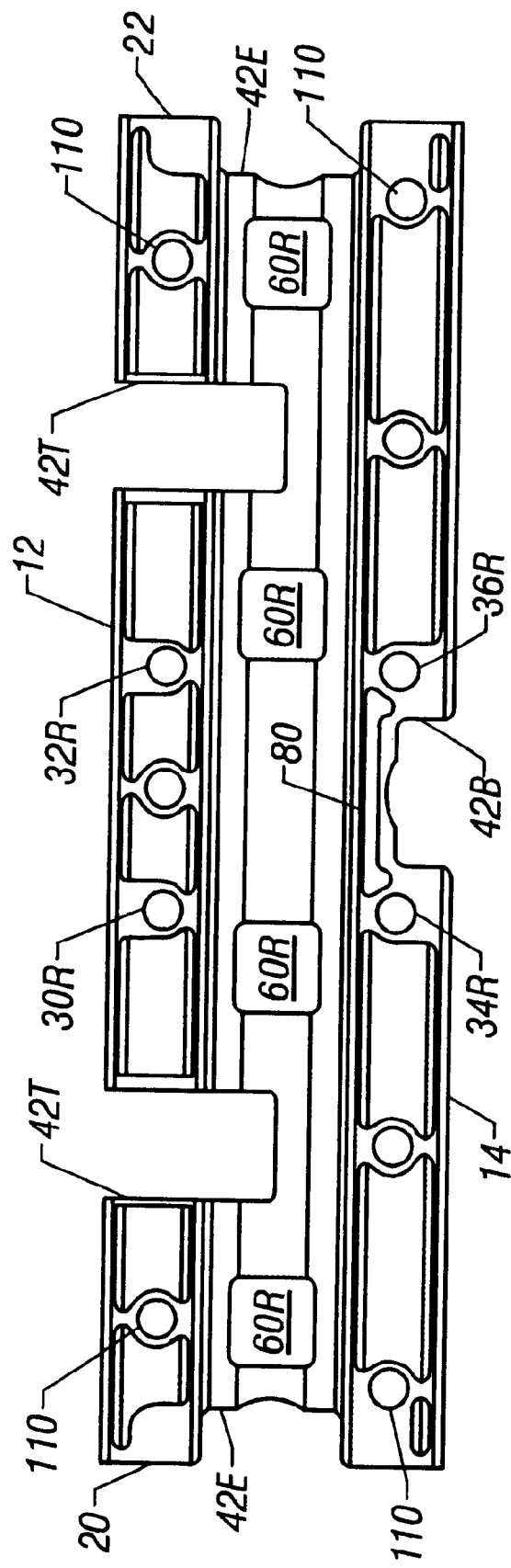
FIG. 2 is a front side elevation view of the carrier module of FIG. 1, the rear side being a mirror image thereof.
Figure 3:
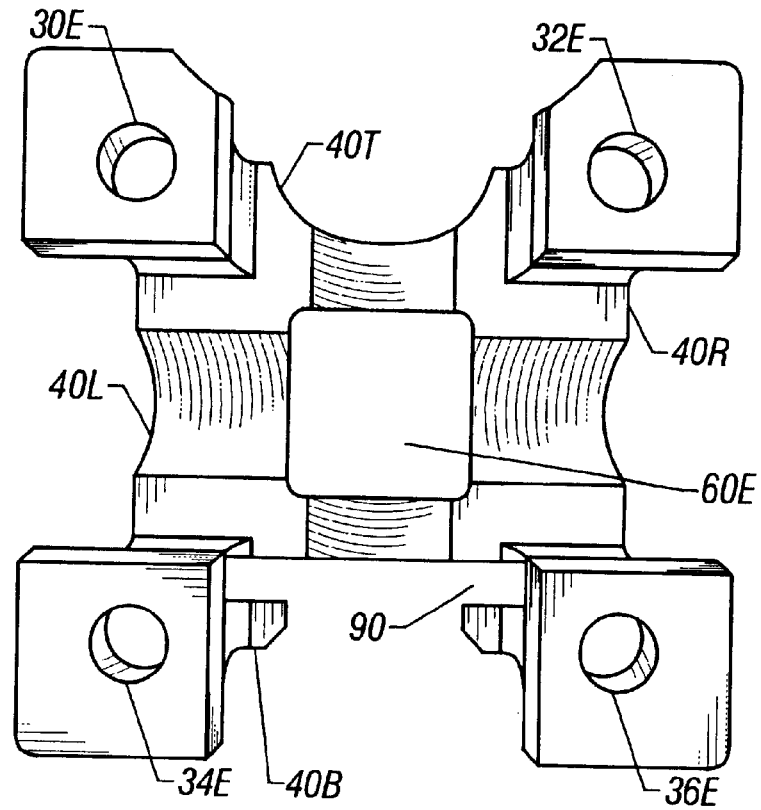
FIG. 3 is a left end elevation view of the carrier module of FIG. 1, the right end being a mirror image thereof.
Figure 9:
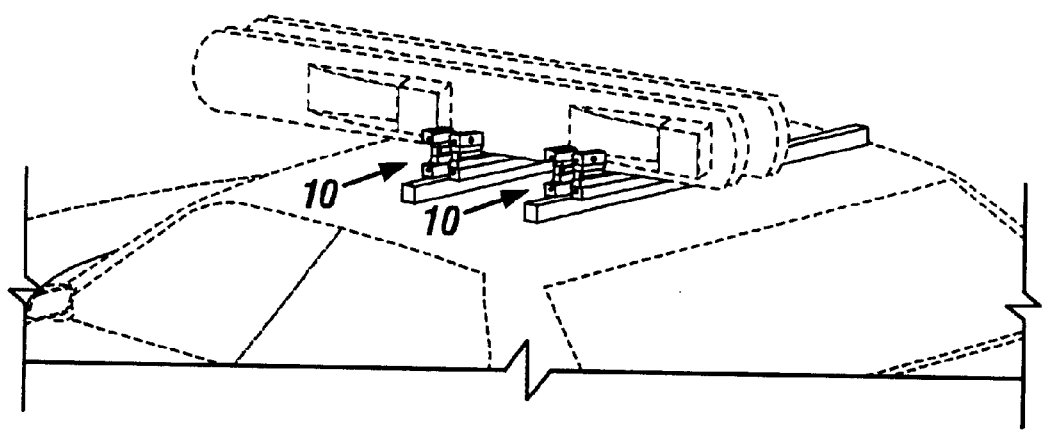
FIG. 9 is a perspective view of the modular cargo carrier system configured for carrying a surf board atop a vehicle.
Figure 10:
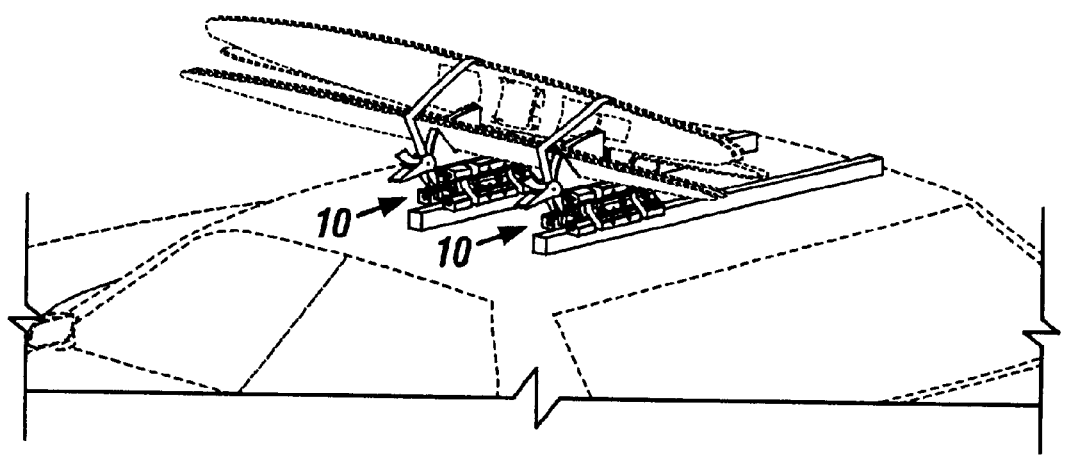
FIG. 10 is a perspective view of the modular cargo carrier system configured for carrying skis atop a vehicle.

Returning again to FIGS. 1–3, each module 10 in this embodiment is also provided with a cargo groove on the top 12 and on at least one of the sides 16, 18 and/or at least one of the ends 20, 22. As shown in the drawings, the module 10 has a longitudinal and at least one transverse groove 40T, 42T on the top 12 and a longitudinal groove 40E and transverse groove 42E on at least one of the ends 20, 22 for supporting cargo. Longitudinal grooves 40 may also be provided on the bottom 14, on one or both of the sides 16, 18 and on both of the ends 20, 22, the longitudinal grooves all being designated by 40 with identifiers T, E, and R, respectively designating the top, end and right side grooves seen in FIG. 1. Similarly, one or more transverse grooves 42 may be provided on both the top 12 where two transverse grooves 42T are shown and on the bottom 14 where a single transverse groove 42B is shown and on either or both of the ends 20, 22 where one transverse groove 42E is shown in FIG. 1 and two are seen in FIG. 2. The longitudinal and transverse cargo grooves 40, 42 preferably also have different cross-sectional configurations as seen in FIGS. 2 and 3. For example, the upper transverse grooves 42T may be of depth and width suitable for reception of snow boards, surfboards, skis and the like as seen in FIGS. 9 and 10 when the modules 10 are affixed to vehicle top bars such that the long direction of the modules 10 is aligned with the bar or bars. The lower transverse single groove 42B seen in FIG. 2 is provided with a different configuration suitable for attachment to a transversely extending bar on the vehicle or, if the module 10 is mounted upside down from the position seen in FIG. 2, the transverse groove 42B is suitable for holding other types of cargo.

Figure 6:
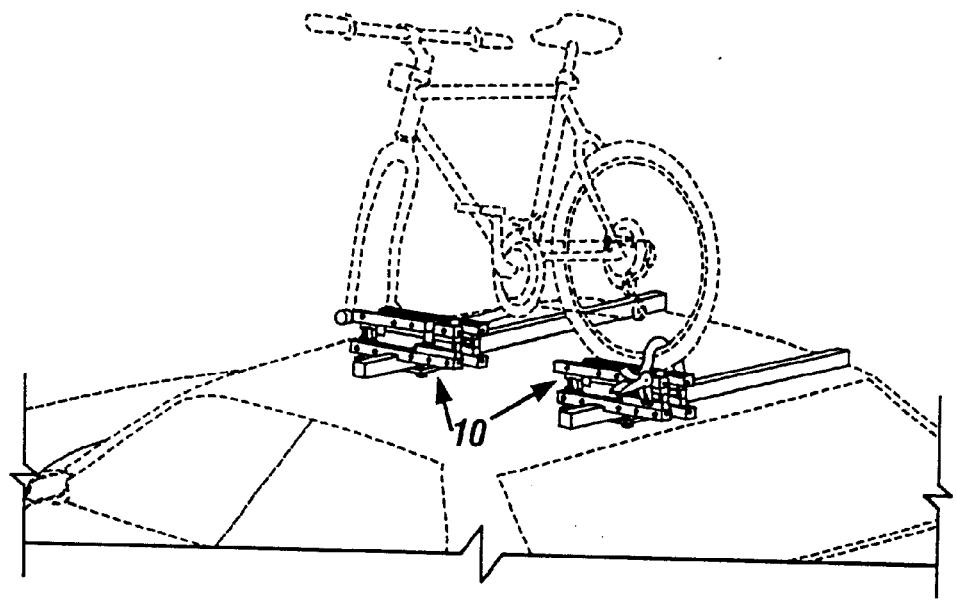
FIG. 6 is a perspective view of a modular cargo carrier system configured for carrying a bicycle atop a vehicle with the front bicycle wheel removed.

It will also be noted that the longitudinal grooves 40, best seen in FIG. 3 are also provided with different cross-sections. The top groove 40T may be configured with width and depth suitable for holding a wheel or wheels of a bicycle as seen in FIG. 6, whereas the left and right side longitudinal grooves 40L and 40R, while being depicted as of substantially identical configuration for symmetry, can also be constructed of different cross-sectional configuration for holding different types of cargo when the module 10 is oriented in a different position on the vehicle top such, for example, where the right side becomes the bottom and the left side becomes the top of the module 10. The bottom longitudinal groove 40B is also of different configuration, preferably suitable for mounting on a roof rack bar on a vehicle top, but the groove 40B is not necessarily limited to use for that purpose. Again, for symmetry, it will be seen that the longitudinal grooves 40 are centrally located on the modules 10 and that one or more transverse cargo grooves 42 can be provided on each of the modules.

Since it is contemplated that the modular cargo carrier system of the present invention may be sold in kit form in the automotive aftermarket, provision is made for attaching two or more modules 10 together in a desired configuration. Accordingly the modules 10 may each include connector reception apertures 60 of square or other non-round configuration at the top, bottom, sides and ends of the modules. The apertures 60 are sized for closely receiving module connectors to be described and/or for receiving cargo pads 70, required for cushioning and securely holding cargo of various configurations without damage or scratching of the vehicle. One or more connectors and pads will preferably be provided as part of the aftermarket kit package. The cargo pads 70 may be configured with spaced feet 72 which may be made of elastomeric material which can be compressively retained in the apertures 60. The apertures 60 are preferably spaced along the longitudinal cargo grooves 40, the apertures 60T in the top 12 being seen in FIG. 1 and the apertures 60R being seen in FIG. 2 in the right side longitudinal groove 40.

Figure 12:
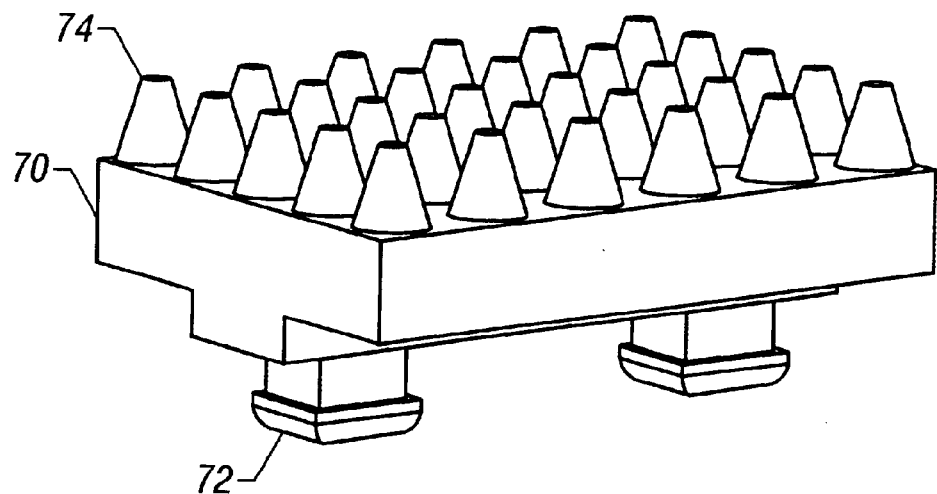
FIG. 12 is a perspective view of one form of pad used with the carrier module for mounting bicycles or other cargo.
Figure 13:
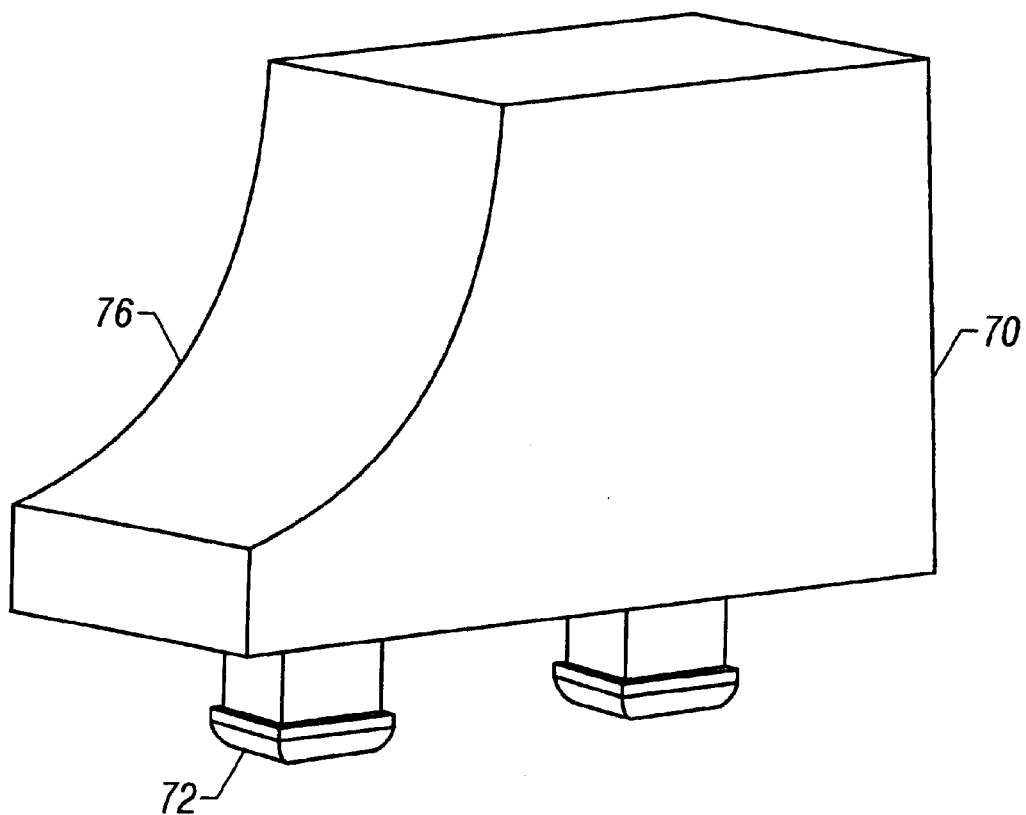
FIG. 13 is a perspective view of one form of a pad used with the carrier module for mounting a boat, surf board, snow board or similar article.
Figure 14:
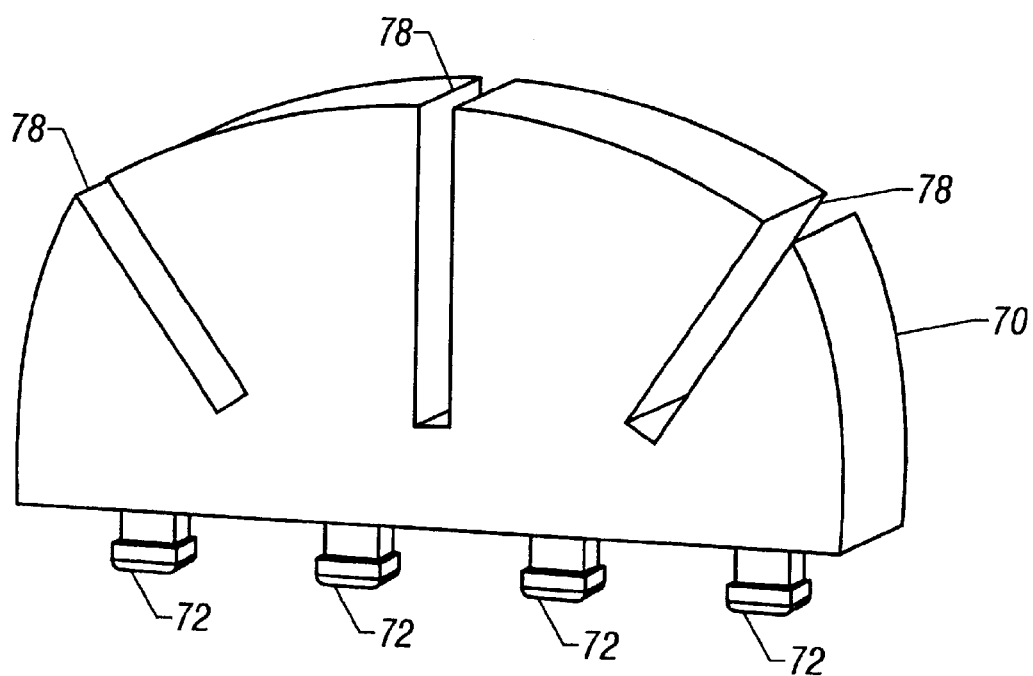
FIG. 14 is a perspective view of one form of a ski pad used with the carrier module.

FIGS. 12, 13 and 14 show cargo pads 70 of different configurations. The pad seen in FIG. 12 is provided with a plurality of spaced generally conical projections 74 on the cargo contacting side of the pad 70 for cushioning cargo such as a bicycle wheel. The conical projections 74 are capable of significantly flexing and bending around the configuration of the vehicle wheel without damage thereto. The pad configuration seen in FIG. 13 includes a contour surface 76 configured as necessary for appropriately cushioning curved articles such as surfboards or boats. The pad configuration of FIG. 14 is provided with a number of spaced slots 78 configured for holding items such as skis. It will be appreciated that a variety of pads of different shapes and sizes can be provided for cushioning cargo of different types, the specific pad configuration or configurations being selectable by the consumer when the purchasing decision is made. The modular cargo carrier system is thus easily adaptable to hold cargo of different types.

Figure 5:
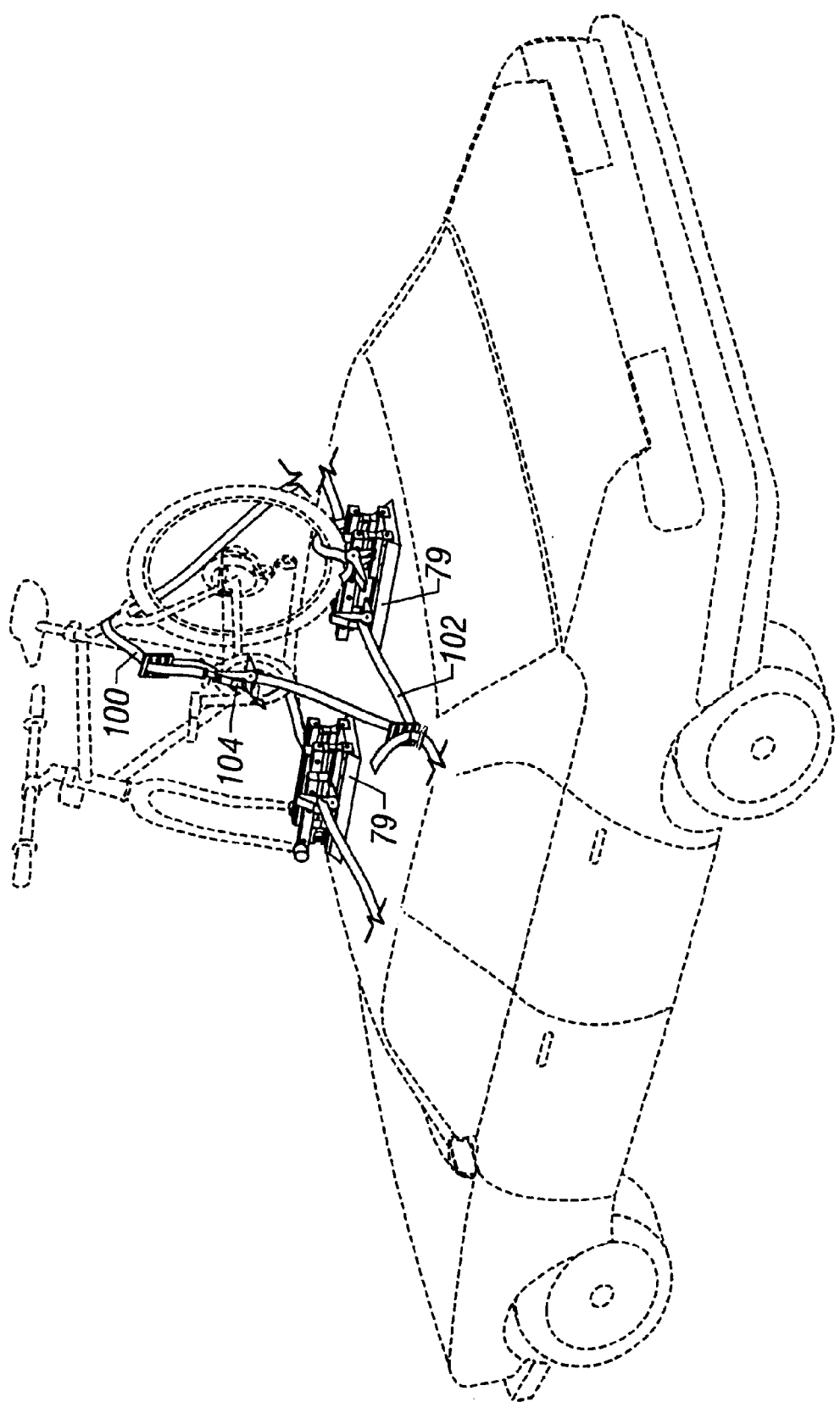
FIG. 5 is a perspective view of affixation of carrier modules to a rooftop with straps.

Module mounting pads 79 seen in FIG. 5 may also be provided if the modules 10 are mounted directly atop a vehicle instead of being attached to the elongated bars of pre-existing roof racks. The module mounting pads 79 may be affixed to the modules 10 in the manner previously described for affixation of the cargo pads 70 to the modules 10, namely, by providing resilient projections or feet on the mounting pads 79 which are received in pad retaining apertures of complementary configuration on the modules 10.

The modules 10 are preferably also provided with one or more slots 80 extending between the sides 16, 18 and with at least one longitudinally extending slot 90 extending between the ends 20, 22 for reception of either or both of cargo tie-down straps 100 or module hold down straps 102 which are necessary if the vehicle has no roof rack bars as seen in FIG. 5. A kit form of the modular cargo system may also therefore include suitable tie-down and hold down straps 100, 102 as well as ratchet or other types of locks 104 for securely affixing the cargo and modules 10 in position.

Figure 7:
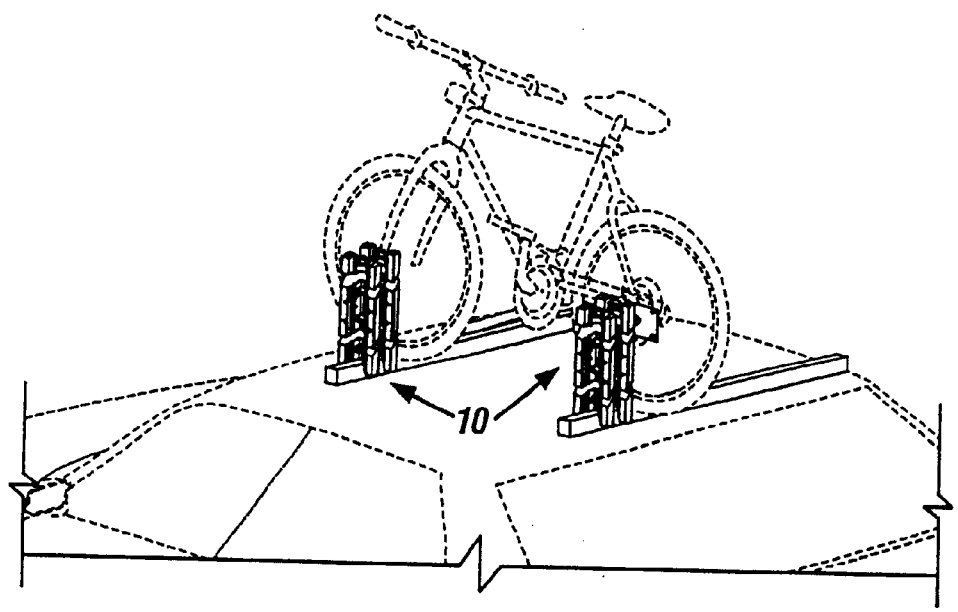
FIG. 7 is a perspective view of the modular cargo carrier system configured in a second manner for carrying a full bicycle atop a vehicle.
Figure 8:
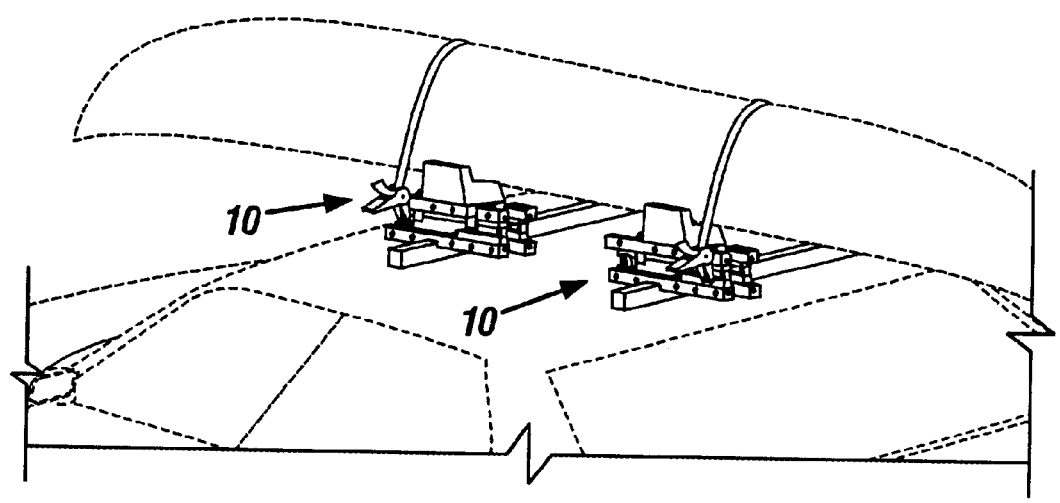
FIG. 8 is a perspective view of the modular cargo carrier system configured for carrying a boat atop a vehicle.
Figure 11:
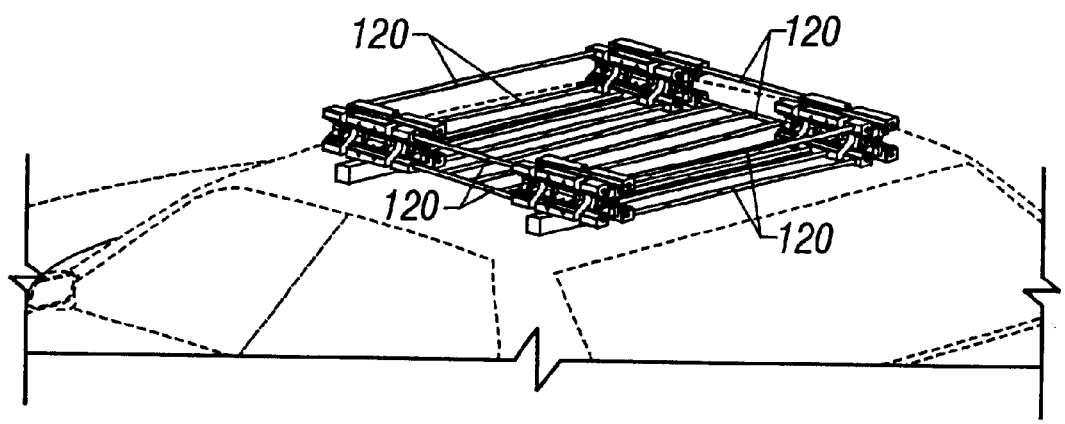
FIG. 11 is a perspective view of four of the carrier modules assembled together with rails configured for carrying cargo atop a vehicle.

The modular cargo system may include a number of modules sold in a kit such as four modules 10 to be positioned at the corners of a rectangle as seen in FIG. 11 so that the modules 10 can be connected to support cargo rack bars 120 to form a generally rectangular cargo rack. For this purpose, each of the modules 10 may also be provided with rack bar reception apertures 110 (FIG. 2) on at least one side of each of the modules 10, the rack bar reception apertures 110 facing each other and being in general alignment with each other when four modules 10 are mounted in a generally rectangular configuration on a vehicle. The aligned internally threaded screw holes 30, 32, 34, 36 can also be used for the purpose of receiving the ends of rack bars 120 or for other purposes such, for example, as for receiving a bolt or other elongated fastener which extends between the spaced front-fork bars of a bicycle to securely affix the front fork to a module 10 as seen in either of the configurations of FIGS. 5, 6 or 7. In FIG. 7, it will be noted that the modules 10 are each oriented in an upright position and are affixed to roof rack bars which extend transversely of the vehicle in a configuration for holding a full bicycle, without the front wheel removed. FIG. 8 shows two modules 10 oriented longitudinally of the vehicle holding a boat which may be cushioned by a pad 70 of the general configuration shown in FIG. 13. FIG. 9 shows how a surfboard or water skis may be carried on the top of a vehicle in the transversely extending cargo groove 42 as does FIG. 10 which shows skis mounted in this configuration.

Figure 15:
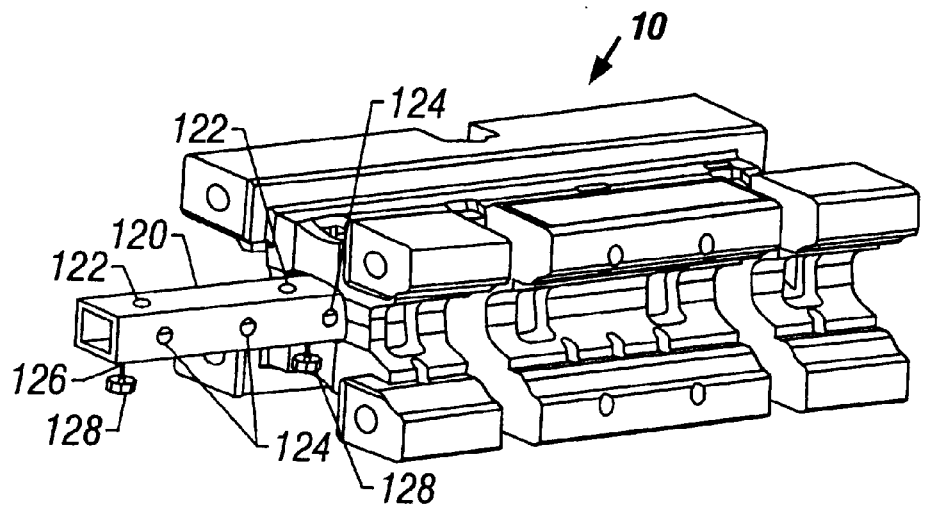
FIG. 15 is a perspective view of an elongate module connector for attaching carrier modules to each other.
Figure 16:
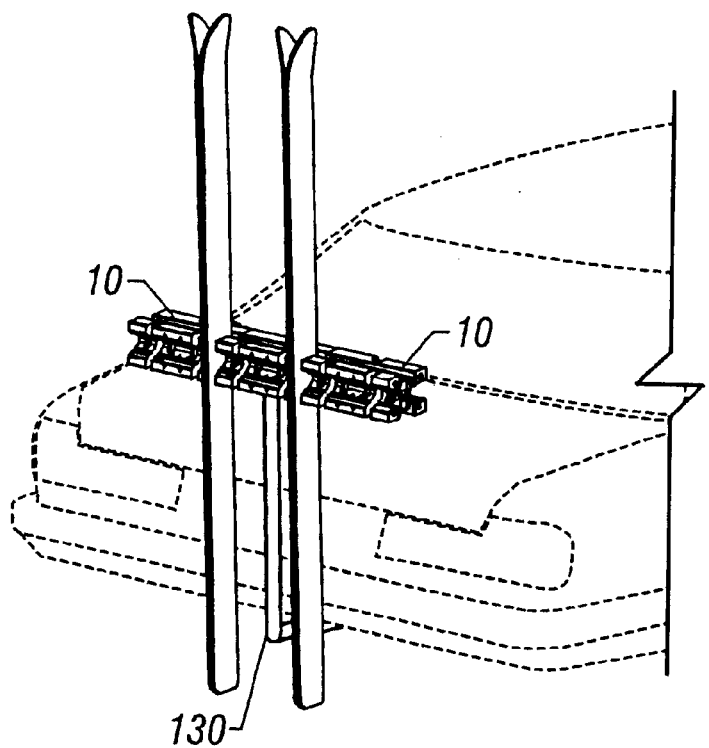
FIG. 16 is a perspective view of a pair of end-to-end connected modules and skis affixed to a trailer hitch bar at the rear of a vehicle.
Figure 17:
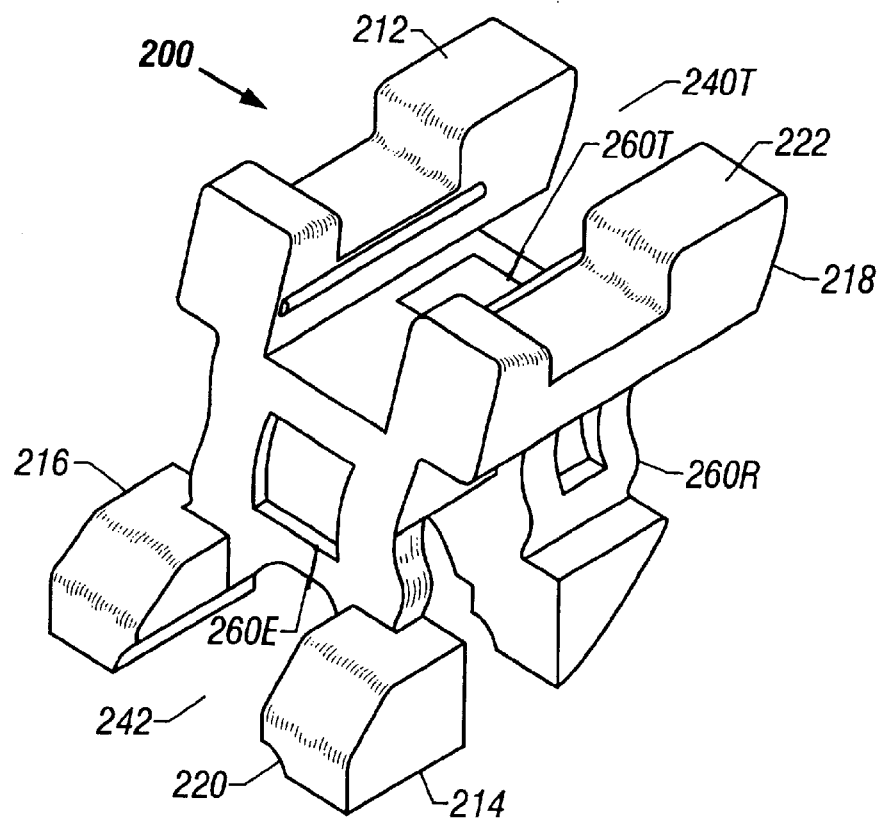
FIG. 17 is a perspective view of a second embodiment of module.
Figure 18:
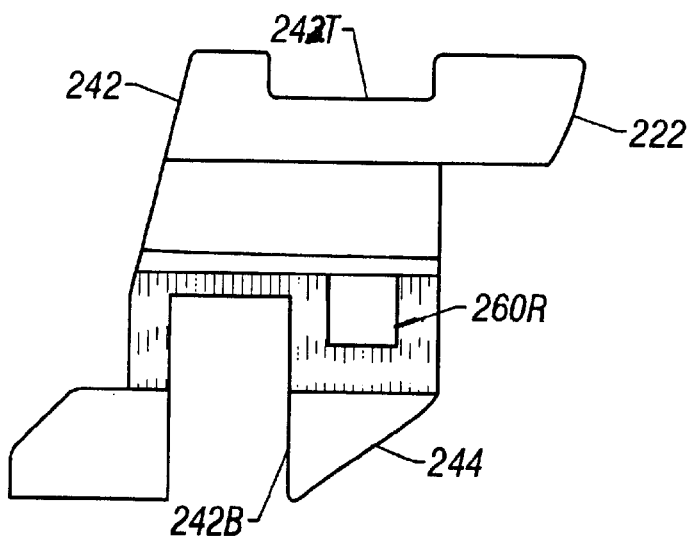
FIG. 18 is a front side elevation view of the carrier module of FIG. 2, the rear side being a mirror image thereof.

FIG. 15 shows a connector for connecting two of the modules 10 to each other. The module connector 120 is shown in the form of an elongate bar of square configuration sized to be slidably received in the module apertures 60. The cross-sectional configuration of the connector 120 must of course be complementary to the cross-section of the apertures 60 which is preferably other than circular. The module connector 120 has bores 122, 124, preferably internally threaded, on one or more of the top, bottom and sides of the connector 120 as shown. The bores 122, 124 are used for reception of bolts 126 having heads 128 for attaching two modules 10 together in desired configuration. One such configuration is seen in FIG. 16 in which two modules 10 are attached side-to side, side-to end, or end-to-end as shown using a single connector 120. Each module may be supported on a flat, generally horizontally extending plate at the upper end of a trailer hitch bar 130 to which the modules 10 may be bolted generally in the manner described above with reference to attachment of the module 10 of FIG. 4 to the plate 50.

The modules 10 shown and described above, being generally symmetrical, may easily be oriented in the same or different orientations and, if desired, may be connected to each other in a variety of different positions to carry cargo of different types and configurations on vehicles of different configurations equipped or not equipped with equipment such as roof racks and trailer hitch supports as described.

Figure 19:
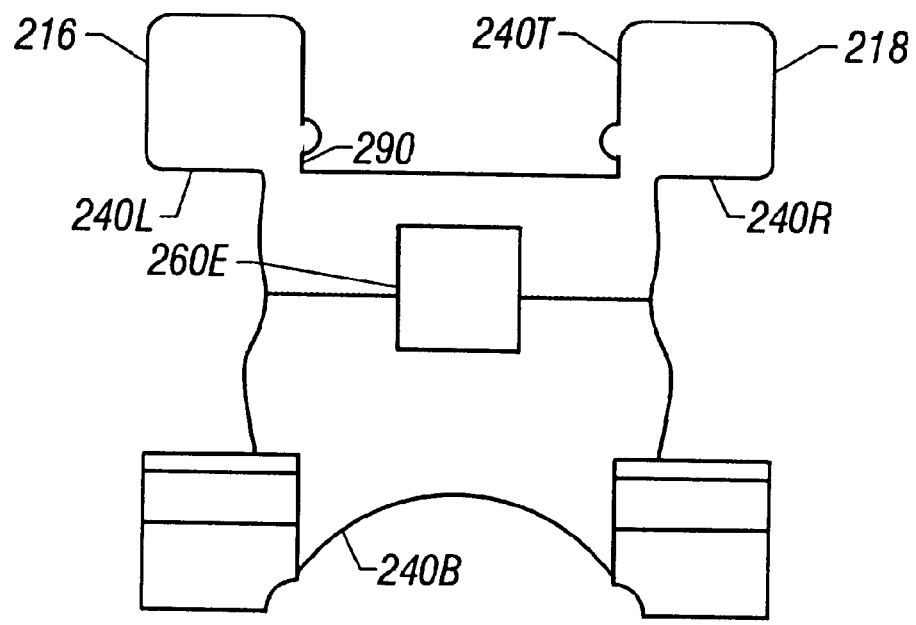
FIG. 19 is a left end elevation view of the carrier module of FIG. 17.
Figure 20:
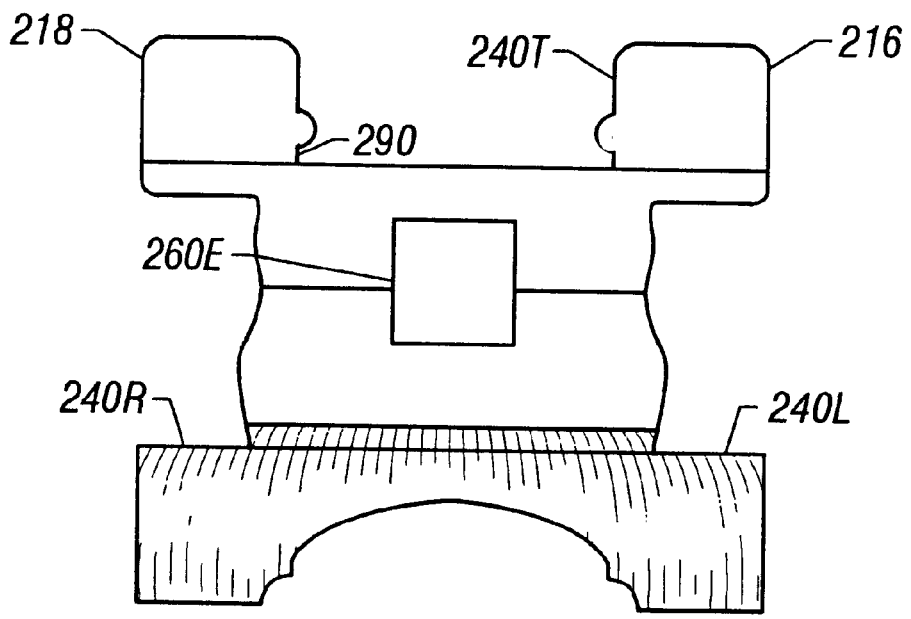
FIG. 20 is a right end elevation view of the carrier module of FIG. 17.

A second embodiment of module 200 is shown in FIGS. 17–20 and shares most of the features of the modules 10 described above. For example, the modules 200 also have a top 212, a bottom 214, left and right sides 216, 218 and ends 220, 222. Longitudinal grooves 240T, 240B, 240L and 240R are seen at the top, bottom, left and right sides respectively as depicted in FIGS. 19 and 20. Transverse grooves are seen on the top and bottom at 242T and 242B. It will be noted that these grooves are not all of the same cross-sectional configuration and are therefore useful for accommodating cargo of different types merely by turning the modules 200 to the desired position for accommodating the cargo to be carried. Also, apertures 260 which extend from end to end and from side to side of the modules 200 may be provided for reception of module connectors of the type described above if desired. The modules 200 are shorter in the longitudinal direction than the modules 10 and are shown with contoured cargo contact surfaces 242, 244 on the ends 220, 222 so that cargo such as a surfboard or kayak may be affixed to the modules with straps which may be received in a strap slot such as slot 290 seen in FIGS. 19 and 20. The shapes of the contoured end surfaces 242, 244 need not be the same and each is easily adapted to the shape of cargo to be transported.

Persons skilled in the art will appreciate that various additional modifications of the embodiments of the invention described above may be made without departing from the teachings herein and that the scope of protection is defined by the claims which follow.

What is claimed is:

1. A cargo carrier module having a top, a bottom, sides and ends, means on said bottom and on at least one of said sides and ends for attaching said module to a support, and said module further including grooves on said top and on at least one of said sides and ends, at least some of said grooves having different cross-sectional configurations for supporting cargo of different configurations in said grooves.

2. The module of claim 1, wherein said means for attaching includes fastener reception bores in said module.

3. The module of claim 2, comprising fastener reception bores on at least one of said sides and on at least one of said ends for attaching said module to a support.

4. The module of claim 3, comprising fastener reception bores on each of said sides.

5. The module of claim 4, comprising fastener reception bores on each of said ends.

6. The module of claim 2, comprising at least four of said bores on each of said top and bottom and on at least one of said ends.

7. The module of claim 1, wherein said means for attaching includes non-circular apertures for receiving non-circular module connectors.

8. The module of claim 7, including said non-circular apertures on at least one of said sides and on at least one of said ends for attaching said module to a support.

9. The module of claim 8, including said non-circular apertures on each of said sides.

10. The module of claim 9, including said non-circular apertures on each of said ends.

11. The module of claim 1, including longitudinal and transverse grooves on said top and on at least one of said ends.

12. The module of claim 11, including longitudinal and transverse grooves on at least one of said sides and on each of said ends.

13. The module of claim 12, including said grooves on each of said sides.

14. A modular cargo carrier system comprising at least one pair of carrier modules and means for attaching said modules to a vehicle, said modules each having a top, a bottom, sides and ends, means on said bottom and on at least one of said sides and ends for attaching said module to a support, and said module further including grooves on said top and on at least one of said sides and ends, at least some of said grooves having different cross-sectional configurations for supporting cargo of different configurations in said grooves.

15. The system of claim 14, wherein said means for attaching includes threaded fasteners and fastener reception bores in said module.

16. The system of claim 15, wherein said modules each include fastener reception bores on at least one of said sides and on at least one of said ends for attaching said modules to a support.

17. The system of claim 15, said modules each include at least four of said bores on each of said top and bottom and on at least one of said ends.

18. The system of claim 14, including at least one non-circular module connector and wherein said modules each include non-circular apertures for receiving said non-circular module connector.

19. The system of claim 14, wherein each of said modules includes longitudinal and transverse grooves on said top and on at least one of said ends.

20. The system of claim 19, wherein each of said modules includes longitudinal and transverse grooves on at least one of said sides.

21. The system of claim 18, wherein said non-circular apertures comprise pad retaining means on said tops for retaining cargo pads on said modules.

22. The system of claim 21, wherein said pad apertures are spaced along longitudinal cargo grooves.

23. The system of claim 22, further including cargo pads having resilient retainer projections receivable in said non-circular apertures.

24. The system of claim 23, including pads of different configuration for cushioning different configurations of cargo.

25. The system of claim 14, wherein said modules each include strap slots extending between said sides.

26. The system of claim 25, wherein said modules each include a strap slot extending between said ends.

27. The system of claim 26, further including straps for reception in said slots and strap tighteners affixed to said straps.

28. The system of claim 14, further comprising rack bar reception apertures on at least one end and on at least one side of each of said modules, said rack bar reception apertures facing and being in general alignment with each other when said modules are mounted on a vehicle.

29. The system of claim 28, wherein said modules include vertically and longitudinally spaced rack apertures on said end and on said side.

30. The system of claim 29, further including rack bars for reception in said rack apertures.

31. A modular cargo carrier system comprising at least one pair of carrier modules, a connector of non-circular cross section for affixing said modules to each other, said modules each having a top, a bottom, two sides and two ends, and means on each module for attaching said module to a vehicle, said means for attaching being located on said bottom, on at least one of said sides and on at least one of said ends of said module, said modules having cargo grooves on said top and on at least one of said sides and ends for supporting cargo in said grooves and said modules having apertures of cross section complementary to said connector for slidably receiving said connector.

32. The system of claim 31, wherein said module attaching means comprise threaded apertures in said modules.

33. The system of claim 32, wherein said connector includes threaded apertures and bolts for affixing said modules to said connector.

* * * * *